Dec. 22, 1953  R. S. SKINNER  2,663,278
WATER BICYCLE
Filed March 26, 1951  2 Sheets-Sheet 1
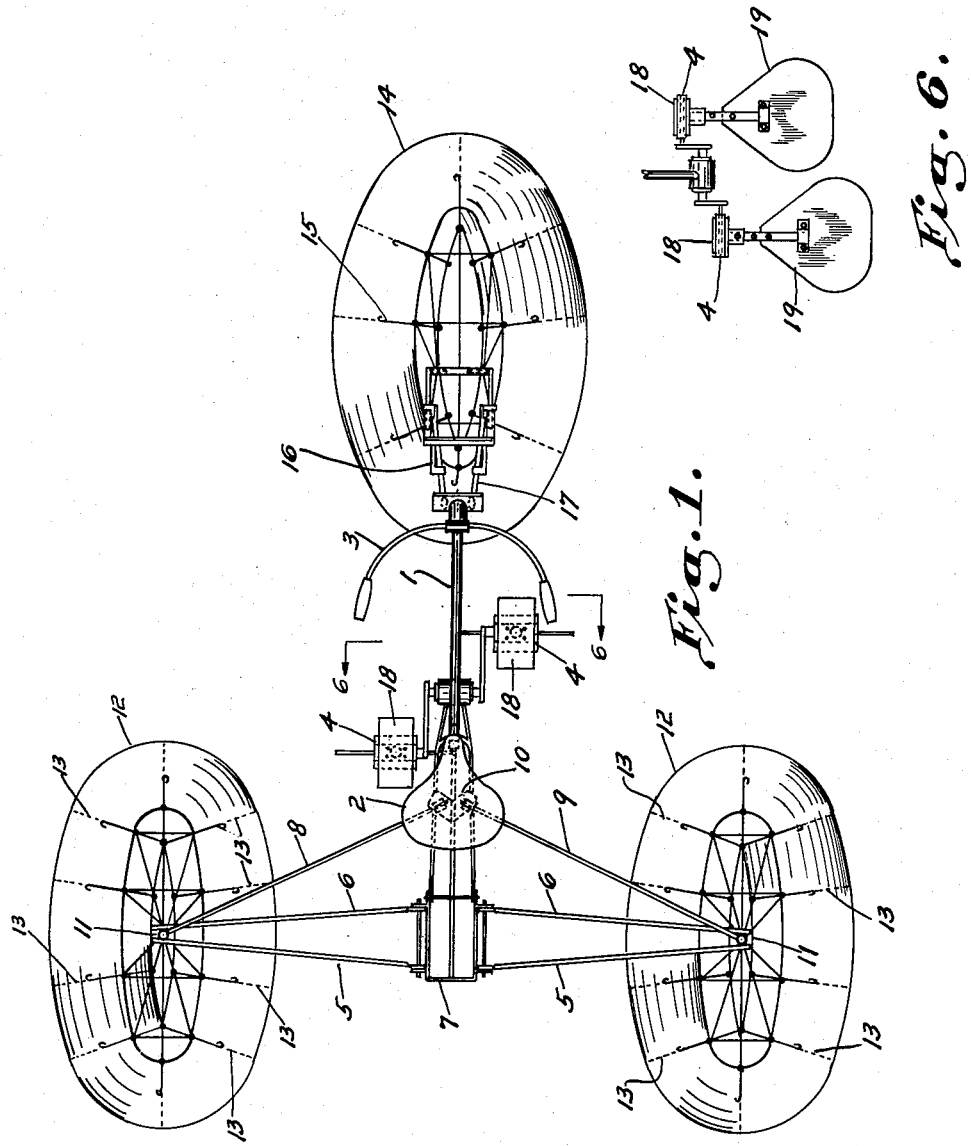
Robert S. Skinner
INVENTOR.
BY Chas. Denegre
Attorney.

Dec. 22, 1953     R. S. SKINNER     2,663,278
WATER BICYCLE
Filed March 26, 1951     2 Sheets-Sheet 2
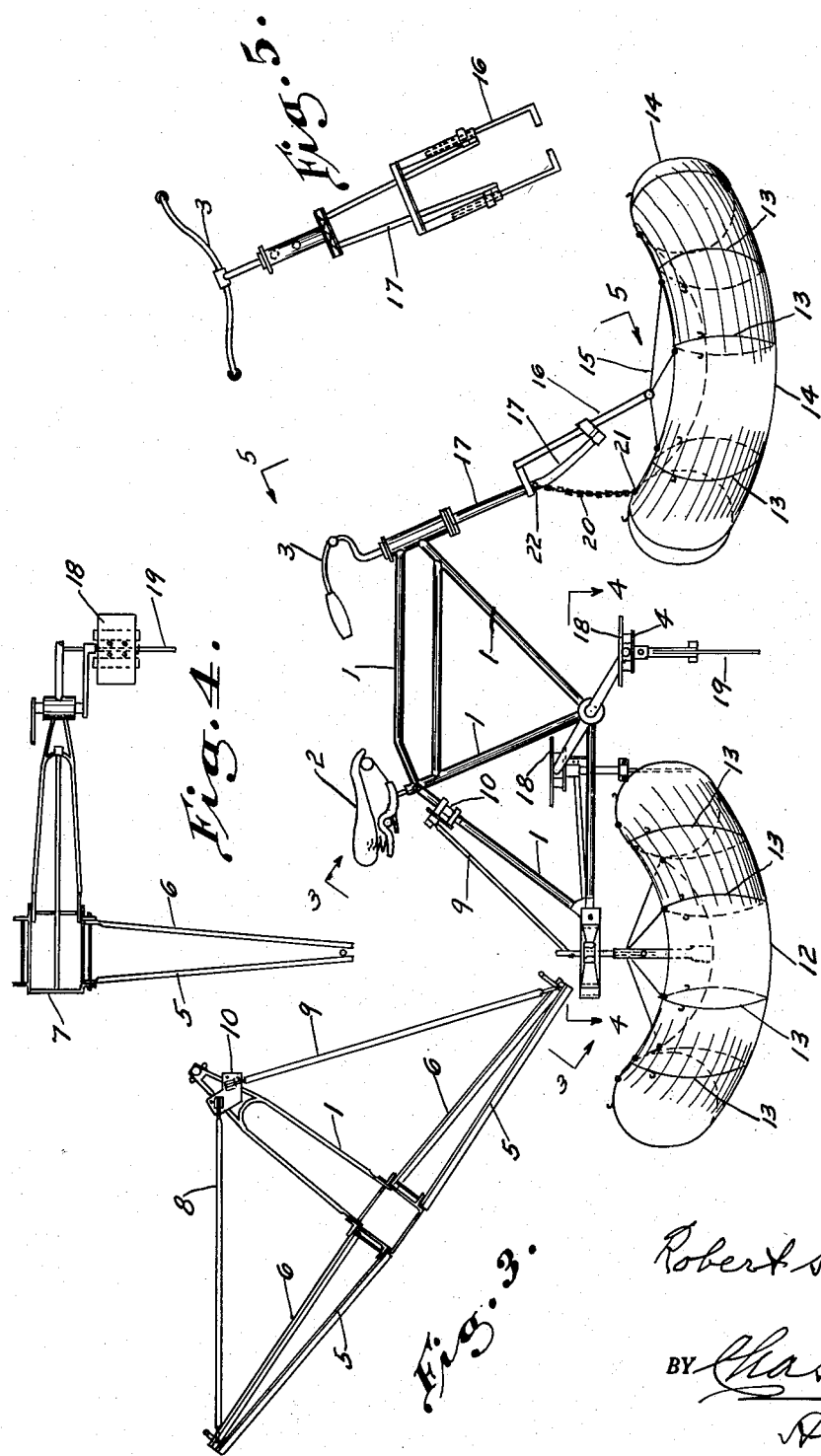
Robert S. Skinner
INVENTOR.
BY Chas. Deniegre
Attorney.

Patented Dec. 22, 1953

2,663,278

UNITED STATES PATENT OFFICE 2,663,278

WATER BICYCLE

Robert S. Skinner, Birmingham, Ala.

Application March 26, 1951, Serial No. 217,488

1 Claim. (Cl. 115—27)

This invention relates to a water bicycle. It has for its main object to provide such a device for use by a fisherman to move about to different places while fishing in a lake or other body of comparatively smooth water. Further objects are to provide such a device highly efficient for its main purpose or any other purpose where it is necessary to move about for short distances on water, simple in structure, comparatively cheap to manufacture, and easy to use.

Other objects and advantages will appear from the drawings and description.

By referring generally to the drawings, a part of this application, it will be observed that Fig. 1 is a plan view of a water bicycle made according to the present invention showing a bicycle frame with extensions attached, inflated automobile tubes as floats, and regular pedals with paddles attached; Fig. 2 is a side elevational view of the parts shown in Fig. 1; Fig. 3 is a view substantially on line 3—3 of Fig. 2; Fig. 4 is a view substantially on line 4—4 of Fig. 2; Fig. 5 is a view on line 5—5 of Fig. 2; and Fig. 6 is a view on line 6—6 of Fig. 1 showing the pedals with paddles attached.

Similar reference numerals refer to similar parts throughout the several views.

Referring to the drawings in detail it will be seen that the device comprises a regular bicycle frame 1 with seat 2, handle bars 3 and pedals 4. A second frame consisting of rods or tubes 5 and 6 are attached to an extension bracket 7 attached to the rear of the bicycle frame. Rods or tubes 8 and 9 are attached by an end of each to the frame at 10. These rods or tubes are attached by their outer ends to wire frames 11 that provide for inflated automobile tire tubes 12 to be held fastened to the wire frames by cords 13 looped around the inflated tubes. A third inflated tube 14 is attached to a wire bracket 15 attached to an extension 16 supported by the front fork 17 of the frame. The pedals 4 are provided with plates 18 and paddles 19 that depend from the bottom of the pedals. The paddles 19 are in the water during approximately the lower half of their revolutions. A connecting chain 20 is attached to the rear of the front wire bracket at 21 and to the fork at 22 to prevent the front end of the inflated tube to extend upward as the wire frame is attached at a point rear of the center of the inflated tube.

From the foregoing it will appear that when the water bicycle is placed upon the surface of water, a person mounted upon same in the same manner as for riding a bicycle, will be able to move the device forward or backward by use of the pedals with the paddles attached thereto.

The device may be made of any material suitable for the purpose, but I prefer to use a bicycle frame with additional rods or tubes attached thereto, fastened to wire frames adapted for tieing the inflated tubes thereto, and flat paddles attached to the bicycle pedals. Also the various parts may be made in different sizes and capacities.

While I have shown and described the preferred embodiment of my invention, I do not wish to limit same to the exact and precise details of structure, but reserve the right to make all modifications and changes so long as they remain within the scope of the invention and the following claim.

Having described my invention I claim:

A water bicycle of the character described comprising a bicycle frame with a seat attached thereon, handle bars, two foot pedals mounted in the lower part of said frame, a flat metal plate attached to the upper face of each of said pedals, a paddle member attached to and depending from the under face of each of said pedals, each paddle positioned at a ninety degree angle compared with the flat plate mounted above it on the same pedal; each of said paddles being submerged in the water during approximately the lower half of its revolution.

ROBERT S. SKINNER.

References Cited in the file of this patent

UNITED STATES PATENTS

| Number | Name | Date |
|---|---|---|
| 801,071 | Fowler | Oct. 3, 1905 |
| 1,740,216 | Arroyo | Dec. 17, 1929 |
| 1,780,986 | Sipas | Nov. 11, 1930 |

FOREIGN PATENTS

| Number | Country | Date |
|---|---|---|
| 473,843 | France | Oct. 16, 1914 |